(12) United States Patent
Keshavamurthy et al.

(10) Patent No.: US 12,353,893 B2
(45) Date of Patent: Jul. 8, 2025

(54) INTEGRATING COLLECTIONS OF DATA OBJECTS FOR SOFTWARE APPLICATIONS

(71) Applicant: SAP SE, Walldorf (DE)

(72) Inventors: Raghavendra Keshavamurthy, Surrey (CA); Mani Sreedharala, Livermore, CA (US); Sonali Balkrishna Shitole, Bengaluru (IN); Manav Sharma, Sunnyvale, CA (US); Priya Siddeshwar, Bangalore (IN); Harish Kumar Sampangi Rama, Bangalore (IN)

(73) Assignee: SAP SE, Walldorf (DE)

( * ) Notice: Subject to any disclaimer, the term of this patent is extended or adjusted under 35 U.S.C. 154(b) by 108 days.

(21) Appl. No.: 18/064,855

(22) Filed: Dec. 12, 2022

(65) Prior Publication Data

US 2024/0192967 A1    Jun. 13, 2024

(51) Int. Cl.
*G06F 9/445*    (2018.01)

(52) U.S. Cl.
CPC .............................. *G06F 9/44521* (2013.01)

(58) Field of Classification Search
CPC ................................................. G06F 9/44521
See application file for complete search history.

(56) References Cited

U.S. PATENT DOCUMENTS

| | | | |
|---|---|---|---|
| 10,922,279 B1* | 2/2021 | Amancharla | G06F 16/1748 |
| 10,965,547 B1* | 3/2021 | Esposito | H04L 67/10 |
| 2014/0129369 A1* | 5/2014 | Gupte | G06Q 30/0621 |
| | | | 705/26.5 |
| 2017/0161809 A1* | 6/2017 | Dubey | G06F 16/24578 |
| 2018/0129548 A1* | 5/2018 | Kiessle | G06F 11/006 |
| 2019/0272383 A1* | 9/2019 | Luttwak | G06F 21/604 |

* cited by examiner

*Primary Examiner* — Daxin Wu
(74) *Attorney, Agent, or Firm* — Fountainhead Law Group, PC

(57) ABSTRACT

Some embodiments provide a non-transitory machine-readable medium that stores a program. The program may provide a client device a collection of data objects in a subset of the plurality of collections of data objects. The program may receive a selection of a data object in the collection of data objects. The program may determine a set of policies associated with the data object. The program may apply the set of policies on the data object. Based on the application of the set of policies on the data object, the program may determine whether to process the data object.

15 Claims, 10 Drawing Sheets

FIG. 5B

INTEGRATING COLLECTIONS OF DATA OBJECTS FOR SOFTWARE APPLICATIONS

BACKGROUND

Procurement and sourcing are functions that are utilized by many companies and businesses in order to acquire goods and/or services. Some companies or businesses may outsource such functions to a third-party. Other companies or businesses have an internal team of employees that perform procurement and sourcing functions. Such third-parties or internal teams of employees may use a variety of different tools and/or services to perform procurement and sourcing functions. For example, some tools and/or services can include one or more of the following features: selecting suppliers, onboarding suppliers, communicating with suppliers, creating purchase orders, approving purchase orders, tracking the status of purchase orders, managing inventory, managing finances (e.g., billing, payment of goods and/or services, etc.), managing documents, managing budgets, generating reports, etc.

SUMMARY

In some embodiments, the techniques described herein relate to a non-transitory machine-readable medium storing a program executable by at least one processing unit of a device, the program including sets of instructions for: providing a client device a collection of data objects in a subset of the plurality of collections of data objects; receiving a selection of a data object in the collection of data objects; determining a set of policies associated with the data object; applying the set of policies on the data object; and based on the application of the set of policies on the data object, determining whether to process the data object.

In some embodiments, the techniques described herein relate to a non-transitory machine-readable medium, wherein the program further includes sets of instructions for: receiving a request to add a collection of data objects to the plurality of collections of data objects; and adding the collection of data objects to the plurality of collections of data objects.

In some embodiments, the techniques described herein relate to a non-transitory machine-readable medium, wherein the program further includes a set of instructions for receiving, from the client device, a configuration specifying the subset of a plurality of collections of data objects as enabled.

In some embodiments, the techniques described herein relate to a non-transitory machine-readable medium, wherein the plurality of collections of data objects includes an internal collection of data objects.

In some embodiments, the techniques described herein relate to a non-transitory machine-readable medium, wherein the internal collection of data objects is hosted by the device.

In some embodiments, the techniques described herein relate to a non-transitory machine-readable medium, wherein the plurality of collections of data objects includes an external collection of data objects.

In some embodiments, the techniques described herein relate to a non-transitory machine-readable medium, wherein the external collection of data objects is hosted by a computing system.

In some embodiments, the techniques described herein relate to a method including: providing a client device a collection of data objects in a subset of the plurality of collections of data objects; receiving a selection of a data object in the collection of data objects; determining a set of policies associated with the data object; applying the set of policies on the data object; and based on the application of the set of policies on the data object, determining whether to process the data object.

In some embodiments, the techniques described herein relate to a method further including: receiving a request to add a collection of data objects to the plurality of collections of data objects; and adding the collection of data objects to the plurality of collections of data objects.

In some embodiments, the techniques described herein relate to a method further including receiving, from the client device, a configuration specifying the subset of a plurality of collections of data objects as enabled.

In some embodiments, the techniques described herein relate to a method, wherein the plurality of collections of data objects includes an internal collection of data objects.

In some embodiments, the techniques described herein relate to a method, wherein the internal collection of data objects is hosted by the device.

In some embodiments, the techniques described herein relate to a method, wherein the plurality of collections of data objects includes an external collection of data objects.

In some embodiments, the techniques described herein relate to a method, wherein the external collection of data objects is hosted by a computing system.

In some embodiments, the techniques described herein relate to a system including: a set of processing units: and a non-transitory machine-readable medium storing instructions that when executed by at least one processing unit in the set of processing units cause the at least one processing unit to: provide a client device a collection of data objects in a subset of the plurality of collections of data objects; receive a selection of a data object in the collection of data objects; determine a set of policies associated with the data object; apply the set of policies on the data object; and based on the application of the set of policies on the data object, determine whether to process the data object.

In some embodiments, the techniques described herein relate to a system, wherein the instructions further cause the at least one processing unit to: receive a request to add a collection of data objects to the plurality of collections of data objects; and add the collection of data objects to the plurality of collections of data objects.

In some embodiments, the techniques described herein relate to a system, wherein the instructions further cause the at least one processing unit to receive, from the client device, a configuration specifying the subset of a plurality of collections of data objects as enabled.

In some embodiments, the techniques described herein relate to a system, wherein the plurality of collections of data objects includes an internal collection of data objects.

In some embodiments, the techniques described herein relate to a system, wherein the internal collection of data objects is hosted by the device.

In some embodiments, the techniques described herein relate to a system, wherein the plurality of collections of data objects includes an external collection of data objects.

The following detailed description and accompanying drawings provide a better understanding of the nature and advantages of various embodiments of the present disclosure.

BRIEF DESCRIPTION OF THE DRAWINGS

FIGS. 5A and 5B illustrate an example GUI for displaying search results of collections of data objects according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for integrating collections of data objects for software applications. In some embodiments, a computing system can receive a configuration for several collections of data objects. The several collections of data objects may include internal collections of data objects hosted on the computing system as well as external collections of data objects hosted on other computing systems. The configuration may specify a one or more collections of data objects from the several collections of data objects that are to be enabled. In addition, the configuration may specify one of the collections of data objects in the several collections of data objects as being the default collection of data objects. A user of a client device may access the collections of data objects via a first graphical user interface (GUI) that the computing system provides the client device. Via the first GUI, the user of the client device can enter a search query for data objects in the collections of data objects. In response to the search query, the computing system performs a search on the default collection of data objects and provides the search results to the client device through a second GUI. The computing system may receive a selection of a data object through the second GUI. In response to the selection, the computing system can determine a set of policies associated with the data object, apply the set of policies on the data object, and determine whether to process the data object based on the application of the set of policies.

Figure 1:
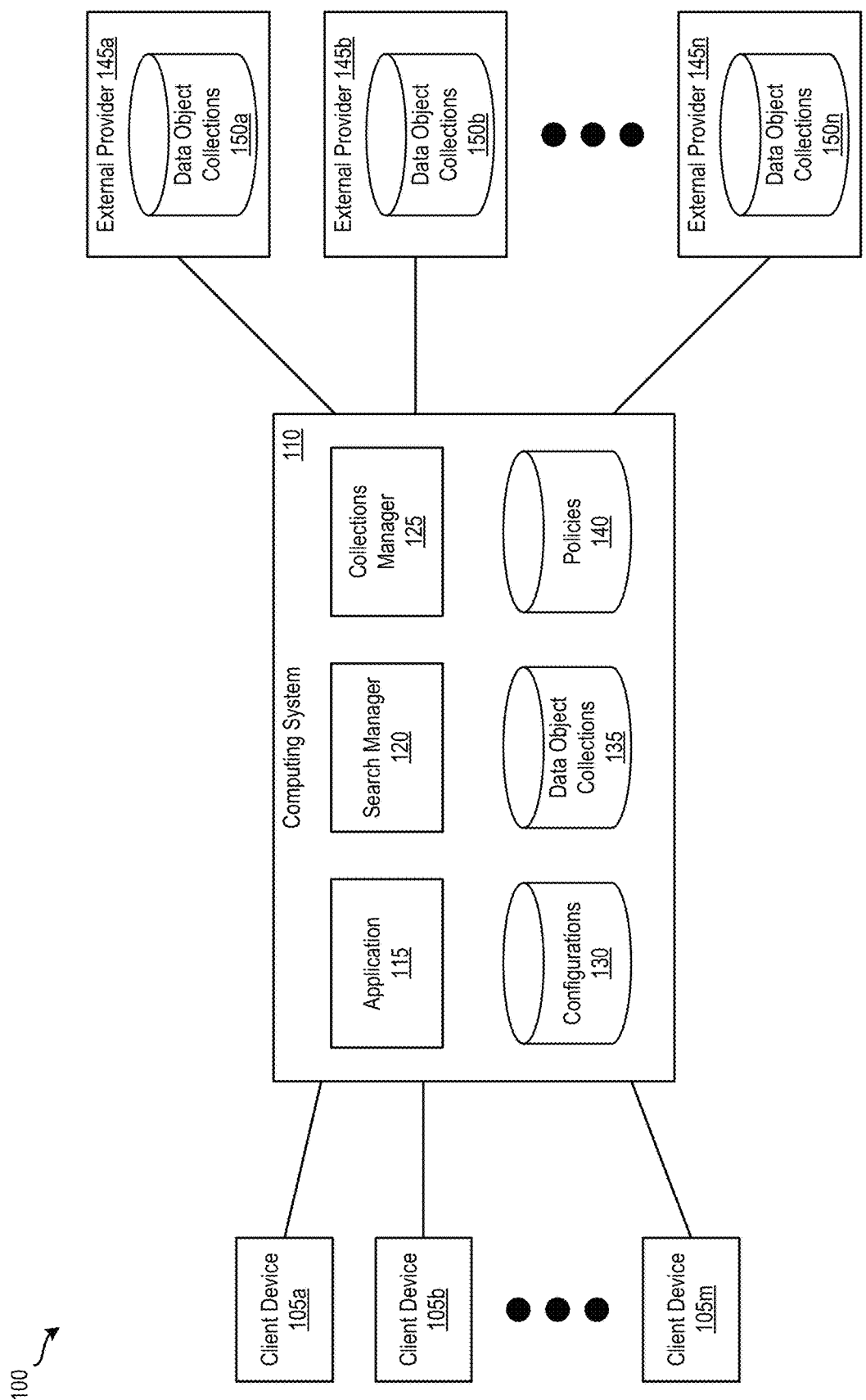
FIG. 1 illustrates a system for integrating collections of data objects according to some embodiments.

FIG. 1 illustrates a system 100 for integrating collections of data objects according to some embodiments. As shown, system 100 includes client devices 105a-m, computing system 110, and external providers 145a-n. Each of the client devices 105a-m is configured to interact with computing system 110. For example, a user of a client device 105 can access application 115 to specify a configuration for collections of data objects. In some instances, a user of a client device 105 may send application 115 a request to add a collection of data objects to a configuration for collections of data objects. In addition, a user of a client device 105 can access application 115 to access collections of data objects based on the configuration. From the collections of data objects, the user of the client device 105 can select a data object for processing.

As depicted, computing system 110 includes application 115, search manager 120, collections manager 125, and storages 130-140. Configurations storage 130 stores configuration for collections of data objects. In some embodiments, a configuration for a set of collections of data objects specifies a collection of data objects in the set of collections of data objects as being a default collection of data objects. The configuration can also specify which collections of data objects in the set of collections of data objects are enabled and which ones are disabled. Data object collections storage 135 is configured to store collections of data objects. In some embodiments, each collection of data objects includes items that can be procured (e.g., by a user of client device 105). Policies storage 140 stores policies for procuring items. In some embodiments, a policy may specify whether an item can be procured by a user based on a set of criteria (e.g., the price of the item, the type of the item, the role of the user, etc.). In some embodiments, storages 130-140 are implemented in a single physical storage while, in other embodiments, storages 130-140 may be implemented across several physical storages. While FIG. 1 shows storages 130-140 as part of computing system 110, one of ordinary skill in the art will appreciate that configurations storage 130, data object collections storage 135, and/or policies storage 140 may be external to computing system 110 in some embodiments.

Application 115 is a software application operating on computing system 110 that provides access to configurations for collections of data objects and access to the collections of data objects themselves. For instance, application 115 may provide a client device 105 with a graphical user interface (GUI) for specifying configurations for collections of data objects. Through such a GUI, application 115 can receive a configuration for collections of data objects from a client device 105. When application 115 receives such a configuration, application 115 stores it in configurations storage 130. In addition, application 115 can provide a client device 105 with a GUI for performing searches on collections of data objects. Upon receiving a search query via this GUI, application 115 sends the search query to search manager 120 for processing. When application 115 receives search results for the search query from search manager 120, application 115 provides the client device 105 with the search results through a GUI. In some cases, application 115 may receive from a client device 105 a request to add a collection of data objects to a configuration. In response to the request, application 115 adds the collection of data objects to the configuration and accesses configurations storage 130 to update the configuration.

Search manager 120 is configured to manage searches for collections of data objects. For example, search manager 120 can receive from application 115 a search query on a collection of data objects. In response, search manager 120 generates a query based on the search query and sends the query to collections manager 125 for processing. In return, search manager 120 may receive search results for the search query from collections manager 125. Search manager 120 then forwards the search results for the search query to application 115.

Collections manager 125 is responsible for managing collections of data objects. For instance, collections manager 125 may receive from search manager 120 a query on a collection of data objects. In response to receiving the query, collections manager 125 determines how to process the query. For instance, if the collection of data objects associated with the query is stored in data object collections storage 135, then collections manager 125 accesses data object collections storage 135 and executes the query in order to receive search results for the query. If the collection of data objects associated with the query is stored in an external provider 145, then collections manager 125 uses the configuration to determine how to execute the query on the collection. For example, the configuration may specify connection information for connecting directly to the data object collections storage 150 of the external provider 145. As another example, the configuration can specify a set of application programming interfaces (APIs) to use to communicate with the data object collections storage 150 of the external provider 145. Based on the configuration, collections manager 125 executes the query on the data object collections storage 150 of the external provider 145 to receive search results for the query. Then, collections manager 125 sends the search results to search manager 120.

Each of the external providers 145a-n includes a corresponding data object collections storage 150 that stores collections of data objects. As such, each of the external providers 145a-n hosts its own collections of data objects. Different data object collections storages 150a-n of external providers 145a-n may be accessed differently by computing system 110. For example, some external providers 145 may allow direct connections to their data object collections storages 150. Other external providers 145 may allow access to their data object collections storages 150 via APIs that the external providers 145 exposes to computing system 110. One of ordinary skill in the art will appreciate that any number of different methods can be used to allow access to data object collections storages 150a-n.

Figure 2:
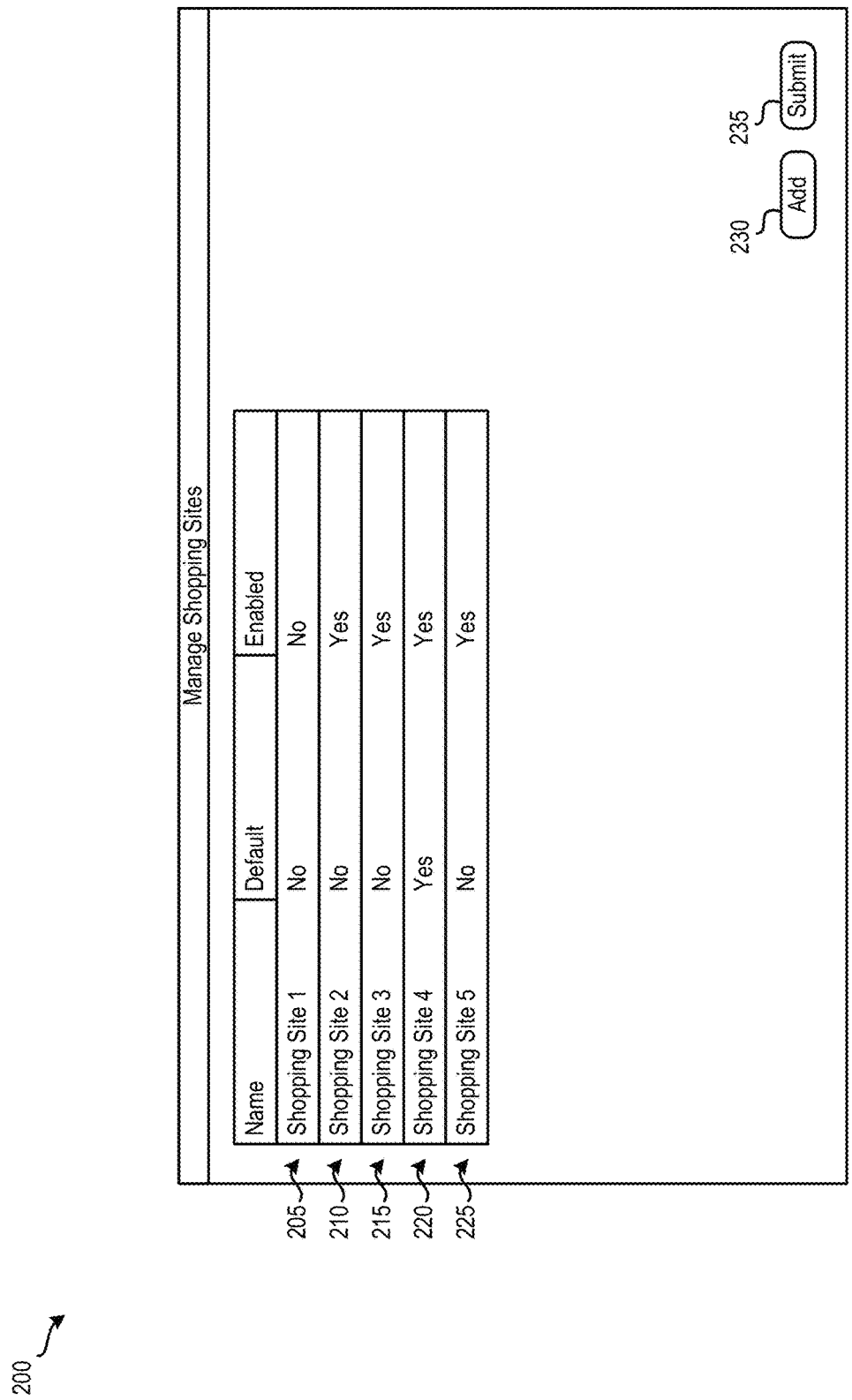
FIG. 2 illustrates an example graphical user interface (GUI) for displaying a configuration for collections of data objects according to some embodiments.

An example operation of system 100 will now be described by reference to FIGS. 1-5. The example operation will demonstrate how a configuration for collections of data objects can be specified as well as how a search may be performed on collections of data objects. The operation starts by a user (e.g., an administrator) of client device 105a accessing a GUI provided by application 115 for displaying a configuration for collections of data objects. FIG. 2 illustrates an example GUI 200 for displaying a configuration for collections of data objects according to some embodiments. In this example, application 115 provides GUI 200 to client device 105a, which the user of client device 105a uses it to view and specify a configuration for collections of data objects.

As shown in FIG. 2, GUI 200 includes user interface (UI) controls 205-235. For this example, each of the collections of data objects are collections of items that can be procured from a particular shopping site. UI control 205 is for specifying whether a shopping site 1 is the default collection of data objects and whether to enable to enable the collection of data objects, UI control 210 is for specifying whether a shopping site 2 is the default collection of data objects and whether to enable to enable the collection of data objects, UI control 215 is for specifying whether a shopping site 3 is the default collection of data objects and whether to enable to enable the collection of data objects, UI control 220 is for specifying whether a shopping site 4 is the default collection of data objects and whether to enable to enable the collection of data objects, and UI control 225 is for specifying whether a shopping site 5 is the default collection of data objects and whether to enable to enable the collection of data objects. UI control 230 is a selectable UI control for adding a collection of data objects to the configuration. UI control 235 is a selectable UI control for submitting the configuration to application 115. Here, the user of client device 105a has specified shopping site 4 as the default collection of data objects. Additionally, the user of client device 105a has specified shopping site 1 as being disabled and shopping sites 2-5 as being enabled.

Figure 3:
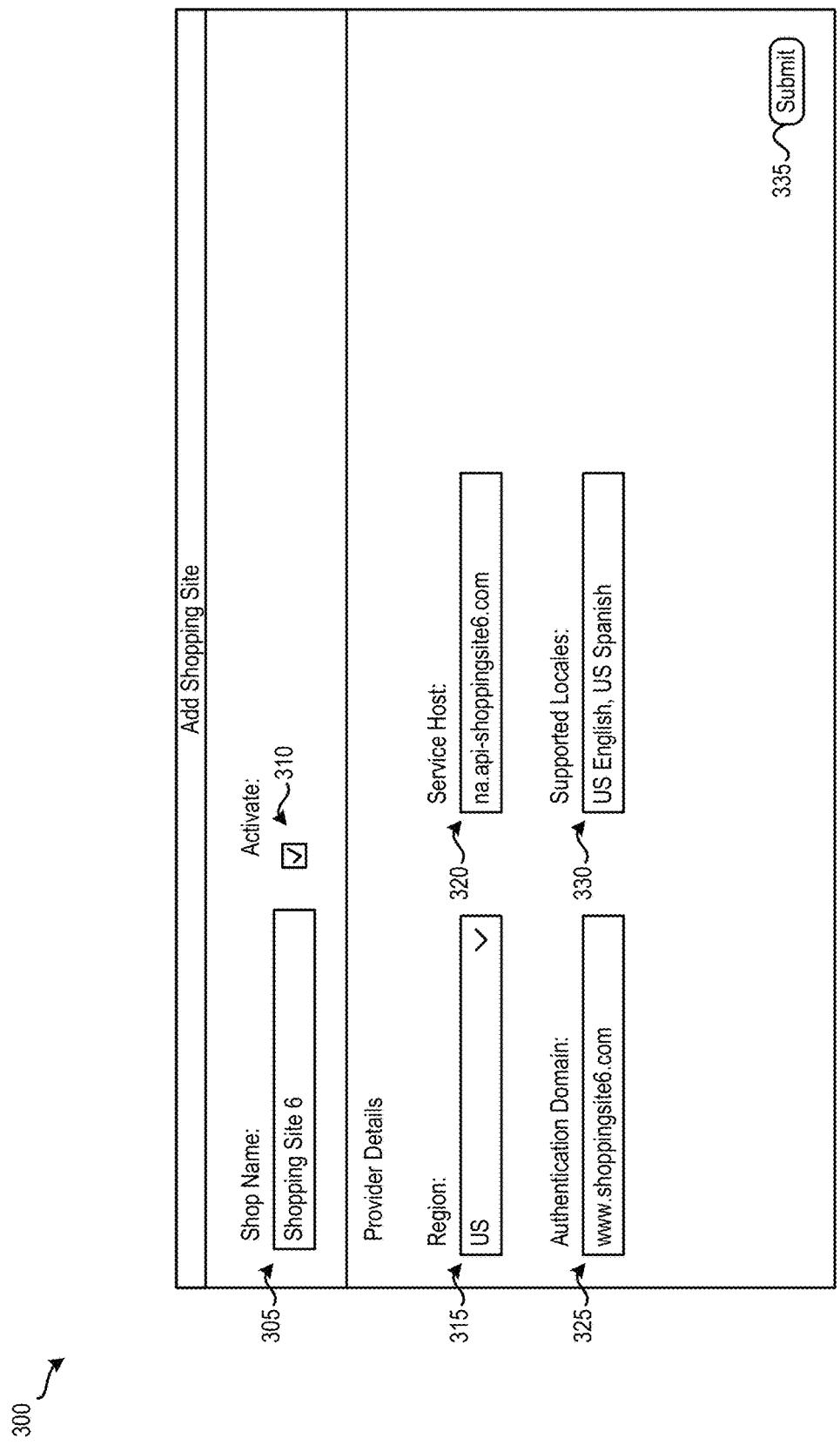
FIG. 3 illustrates an example GUI for adding a collection of data objects to a configuration according to some embodiments.

Next, the user of client device 105a selects UI control 230, which causes application 115 to navigate from GUI 200 to a GUI for adding a collection of data objects. FIG. 3 illustrates an example GUI 300 for adding a collection of data objects to a configuration according to some embodiments. In this example, application 115 provides GUI 300 to client device 105a after the user of client device 105a selects UI control 230. As shown in FIG. 3, GUI 300 includes UI controls 305-330. UI control 305 is a textbox control configured to receive a name of a collection of data objects. UI control 310 is a checkbox control configured to activate or deactivate the collection of data objects. UI control 315 is a drop-down control configured to receive a selection of a region. UI control 320 is a textbox control configured to receive access information (e.g., a uniform resource locator (URL) where APIs can be accessed), UI control 325 is a textbox control configured to receive authentication information (e.g., a URL where authentication is performed), and UI control 330 is a textbox control configured to receive a set of supported locales (e.g., a region and a language). UI control 335 is a selectable UI control for adding the collection of data objects to the configuration. For this example, the user of client device 105a selects UI control 335, which causes client device 105a to send application 115 the information provided via UI controls 305-330 and a request to add the collection of data objects to the configuration shown in GUI 200.

After receiving the information and the request, application 115 accesses configurations storage 130 and updates the configuration by adding the new collection of data objects to the configuration. Next, application 115 updates GUI 200 with the new collection of data objects and provides client device 105a with the updated GUI 200. Then, the user of client device 105a selects UI control 235 to submit the configuration. In response to the selection of UI control 235, application 115 accesses configurations storage 130 and updates the configuration with the options specified in GUI 200.

Figure 4:
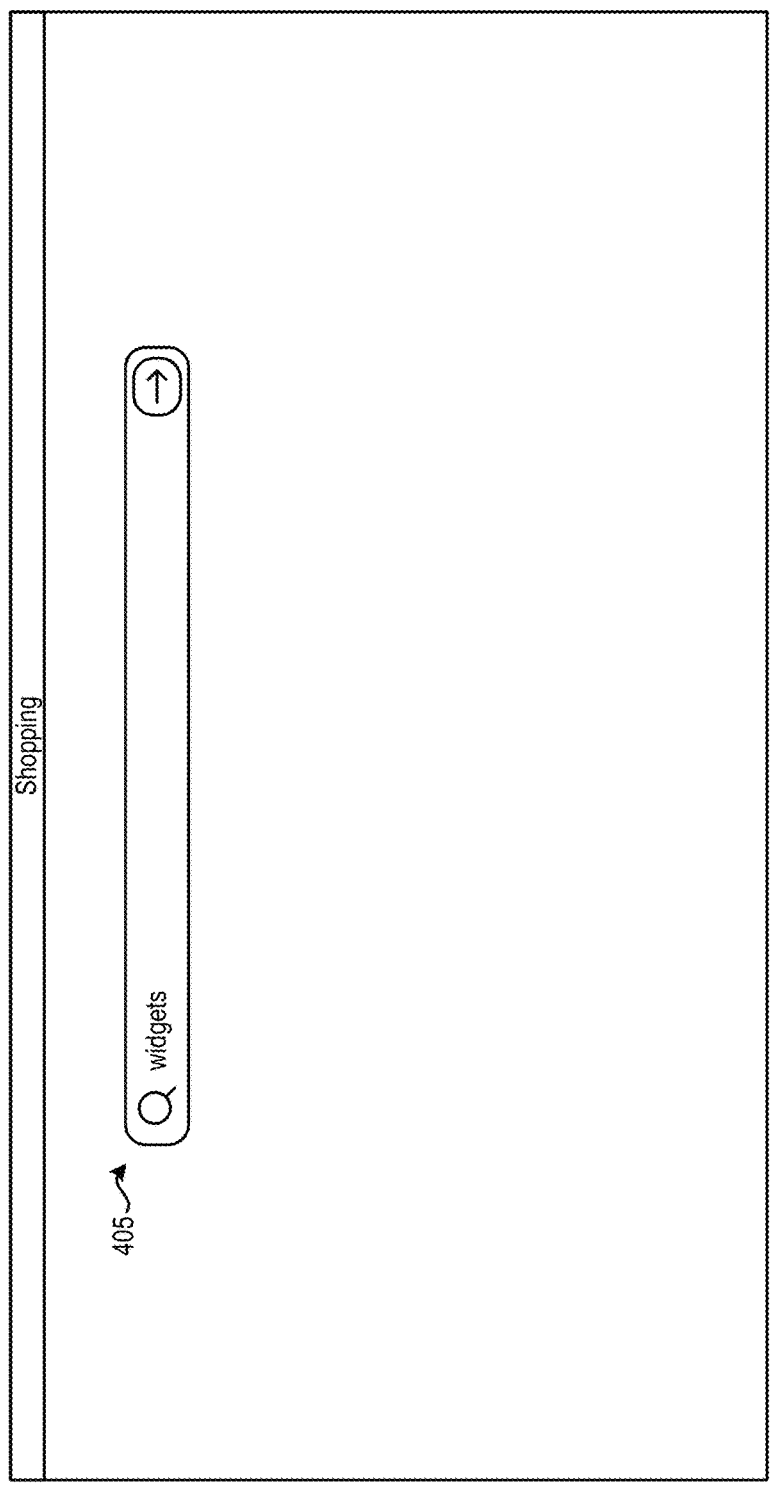
FIG. 4 illustrates an example GUI for searching collections of data objects according to some embodiments.

Continuing with the example, a user (e.g., an employee) of client device 105m now accesses application 115 and selects an option for searching collections of data objects. For this example, the configuration specified in FIG. 2 will be used for the user of client device 105m. FIG. 4 illustrates an example GUI 400 for searching collections of data objects according to some embodiments. In this example, application 115 provides GUI 400 to client device 105m after the user of client device 105m selects the option for searching collections of data objects. As depicted in FIG. 4, GUI 400 includes UI control 405, which is a search box control for receiving search queries on collections of data objects. Here, the user of client device 105m has entered "widgets" as the search query. Then, the user of client device 105m selects the search button in UI control 405 (the arrow icon in this example) to perform a search.

Upon receiving the selection of the search button, application 115 forwards the search query to search manager 120 for processing. When search manager 120 receives the search query, search manager 120 generates a query based on the search query and sends the query to collections manager 125. Once collections manager 125 receives the query, collections manager 125 accesses configurations storage 130 to retrieve the configuration associated with the user of client device 105*m* (the configuration specified in FIG. 2 in this example). Based on the configuration, collections manager 125 determines that the shopping site 4 collection of data objects is the default collection of data objects. As such, collections manager 125 determines the shopping site 4 collection of data objects is hosted on external provider 145*b*. In this example, external provider 145*b* allows access to the collections of data objects stored in data object collections storage 150*b* via a set of APIs exposed to computing system 110. As such, collections manager 125 sends the query to external provider 145*b* via the set of APIs. In return, collections manager 125 receives search results for the search query. Collections manager 125 sends the search results to search manager 120, which forwards them to application 115.

Figure 5A:
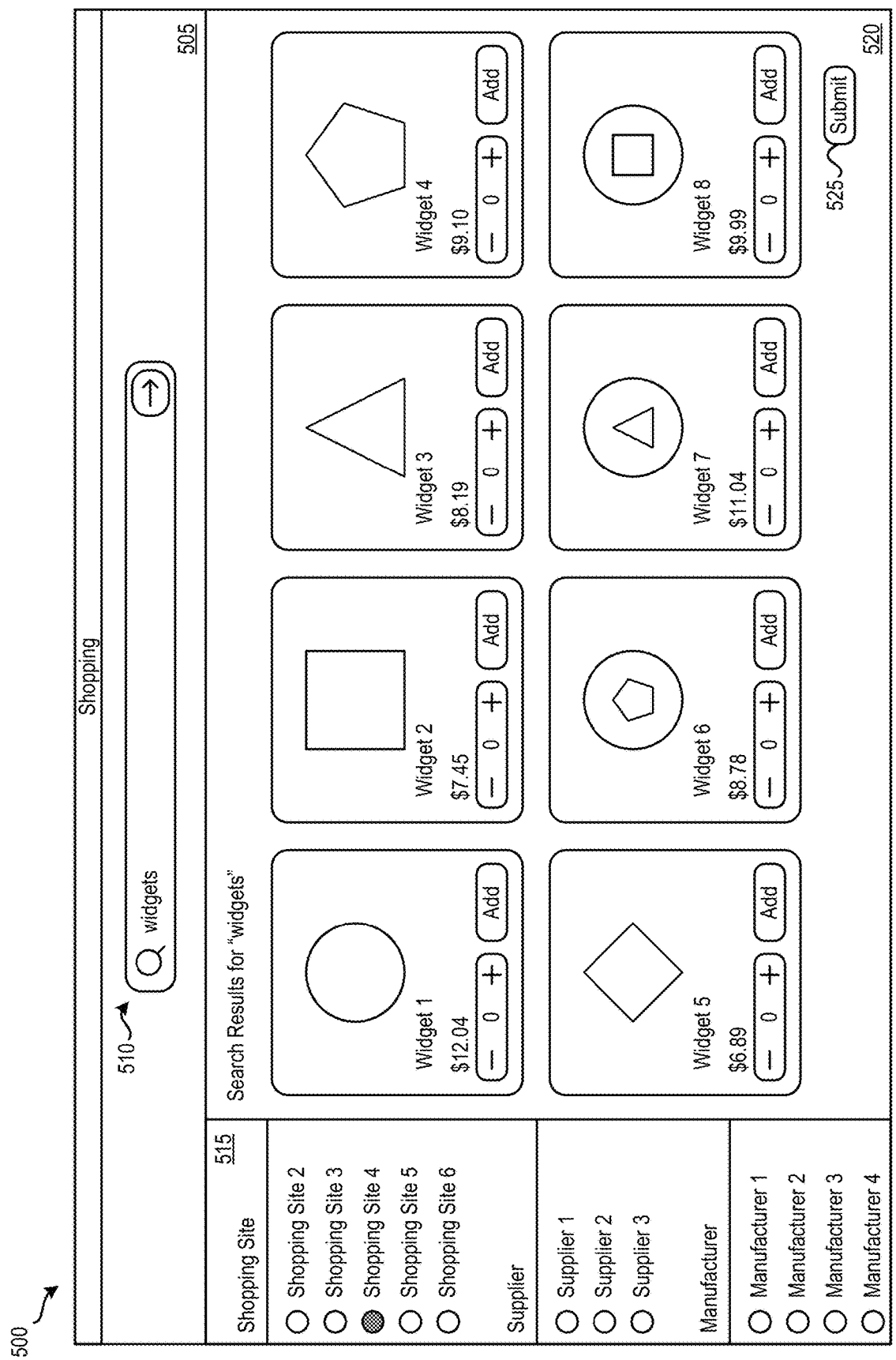

When application 115 receives the search results, application 115 provides them to client device 105*m* through a GUI for displaying search results. FIG. 5A illustrates an example GUI 500 for displaying search results of collections of data objects according to some embodiments. Here, application 115 provides client device 105*m* with GUI 500 in response to the user of client device 105*m* submitting the search query shown in FIG. 4. As illustrated, GUI 500 includes sections 505, 515, and 520. Section 505 includes UI control 510, which is similar to UI control 405 except UI control 510 is displaying the search query provided in UI control 405. Section 515 shows the current collection of data objects on which the search query is applied (shopping site 4 in this example). Also, section 515 includes two sets of filters: a first set of filters on suppliers and a second set of filters on manufacturers. Selection of a filter in the first set of filters causes application 115 to filter the search results based on the selected supplier. Similarly, selection of a filter in the second set of filters causes application 115 to filter the search results based on the selected manufacturer.

Section 520 is for displaying the search results for the search query. For this example, the search results includes eight widgets. Each widget is supplied from one of the suppliers 1-3 and made by one of the manufacturers 1-4. Additionally, each widget includes an image of the widget, a price for the widget, a UI control for specifying a quantity of the, and a UI control for adding the specified quantity of the widget to a shopping cart. When the user of client device 105*m* selects the UI control for adding a widget to the shopping cart, application 115 may access policies storage 140 and identify a set of policies associated with the user. Then, application 115 applies the set of policies on the data object to be added. If any of the policies in the set of policies are violated, application 115 prevents the data object from being added to the shopping cart. If none of the policies in the set of policies are violated, application 115 allows the data object to be added to the shopping cart.

Section 520 also includes UI control 525, which is a selectable UI control for procuring the items in the shopping cart. In cases where the items in the shopping cart belong to an internal collection of data objects, selection of UI control 525 causes application 115 to initiate a procurement process. In cases where the items in the shopping cart belong to an external collection of data objects (e.g., a collection of data objects hosted on an external provider 145), selection of UI control 525 causes application 115 to direct client device 105*m* to a procurement process handled by the computing system hosting the collection of data objects. In this example, selection of UI control 525 causes application 115 to direct client device 105*m* to a procurement process handled by external provider 145*b* since data objects in the search results are hosted on external provider 145*b*.

Next, the user of client device 105*m* selects a different collection of data objects in section 515. In particular, the user of client device 105*m* selects the shopping site 2 collection of data objects. In response to receiving this selection, application 115 sends the search query provided in UI control 510 to search manager 120. Upon receiving the search query, search manager 120 generates a query based on the search query and sends the query to collections manager 125 for processing. In response to receiving the query, collections manager 125 accesses configurations storage 130 to retrieve the configuration associated with the user of client device 105*m* (the configuration specified in FIG. 2 in this example). Based on the configuration, collections manager 125 determines that the shopping site collection of data objects is an internal collection of data objects hosted on computing system 110. Thus, collections manager 125 accesses data object collections storage 135 and executes the query in order to receive search results for the search query. Next, collections manager 125 sends the search results to search manager 120 and search manager 120 forwards them to application 115.

Figure 5B:
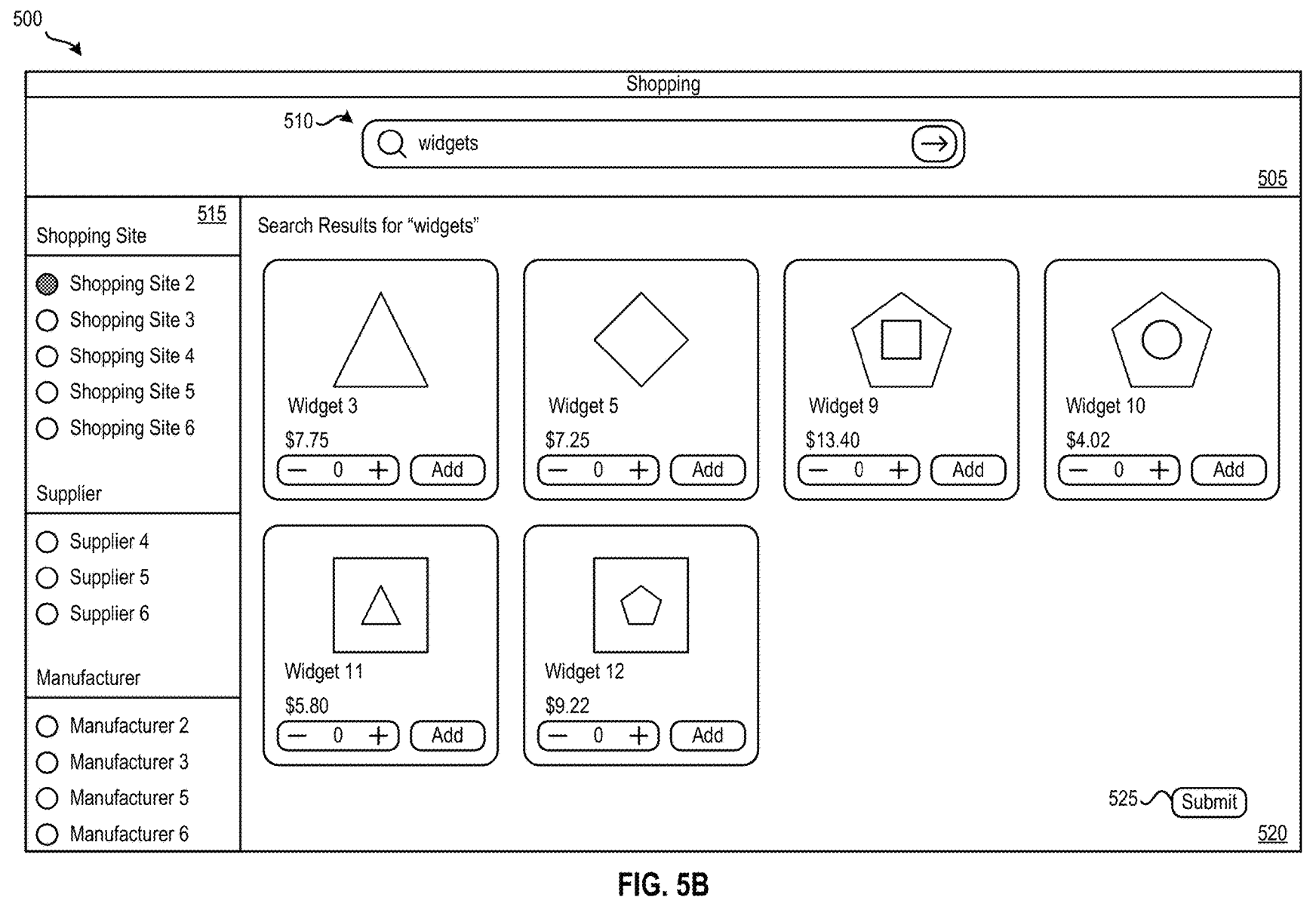

Upon receiving the search results, application 115 provides them to client device 105*m* through a GUI for displaying search results. FIG. 5B illustrates GUI 500 displaying search results of a different collection of data objects according to some embodiments. In this example, application 115 provides client device 105*m* with the GUI 500 illustrated in FIG. 5B after the user of client device 105*m* selected the shopping site 2 collection of data objects. As shown, shopping site 2 is highlighted in sections 505. Also, section 505 shows a different set of suppliers and a different set of manufacturers on which the search results can be filtered.

Section 520 in FIG. 5B is displaying the search results for the search query. Here, the search results includes six widgets. Each widget is supplied from one of the suppliers 4-6 and made by one of the manufacturers 2, 3, 5, and 6. Similar to FIG. 5A, each widget in FIG. 5B includes an image of the widget, a price for the widget, a UI control for specifying a quantity of the, and a UI control for adding the specified quantity of the widget to a shopping cart. When the user of client device 105*m* selects the UI control for adding a widget to the shopping cart, application 115 may access policies storage 140 and identify a set of policies associated with the user. Then, application 115 applies the set of policies on the data object to be added. If any of the policies in the set of policies are violated, application 115 prevents the data object from being added to the shopping cart. If none of the policies in the set of policies are violated, application 115 allows the data object to be added to the shopping cart.

Figure 6:
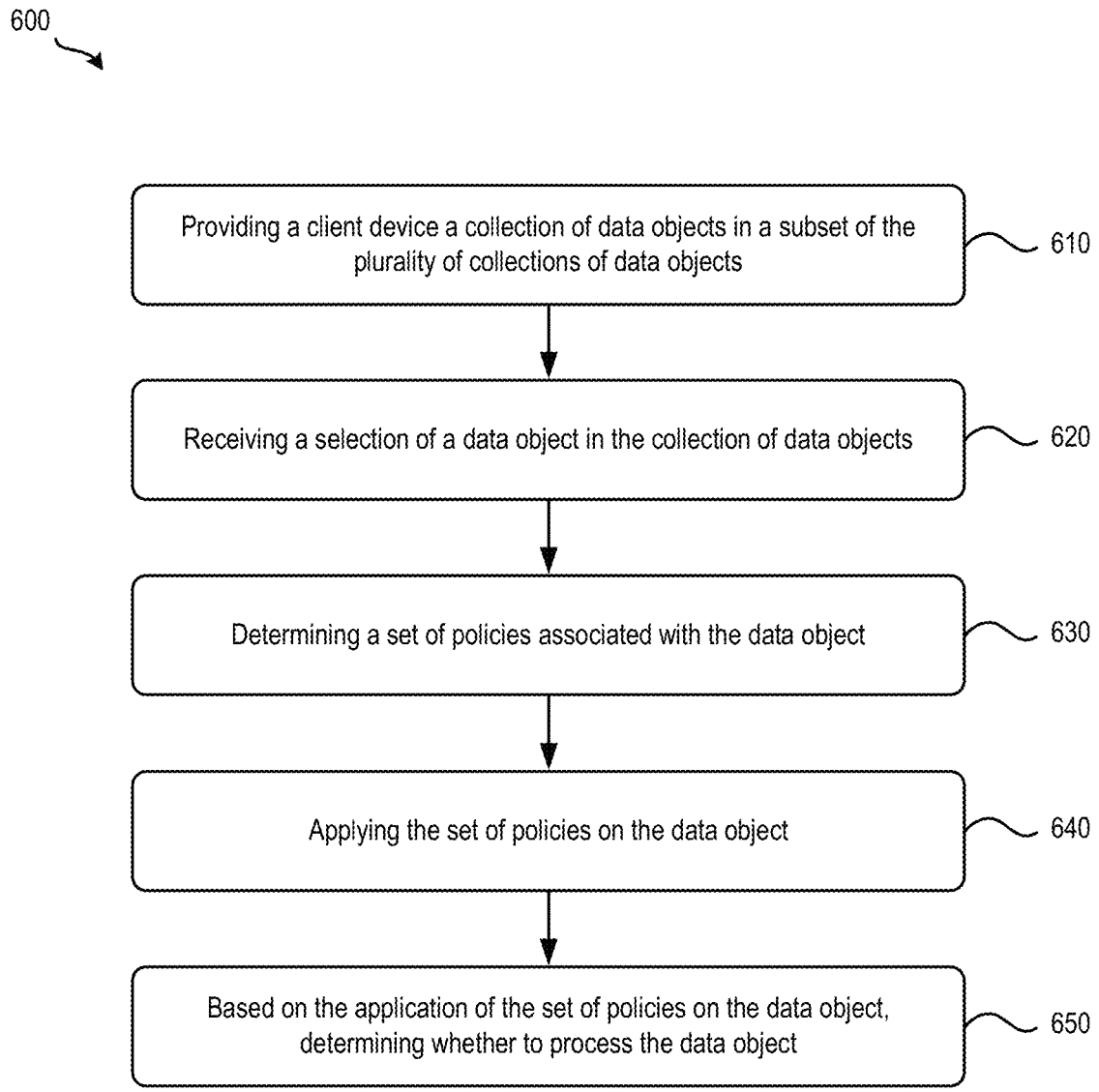
FIG. 6 illustrates a process for processing data objects according to some embodiments.

FIG. 6 illustrates a process 600 for processing data objects according to some embodiments. In some embodiments, computing system 110 performs process 600. Process 600 begins by providing, at 610 a client device a collection of data objects in a subset of the plurality of collections of data objects. Referring to FIGS. 1 and 5A as an example, application 115 can provide client device 105*a* GUI 500 for displaying search results for the search query shown in FIG. 4.

Next, process 600 receives, at 620, a selection of a data object in the collection of data objects. Referring to FIGS. 1 and 5A as an example, application 115 can receive from the user of client device 105*m* a selection of a UI control for adding a widget to a shopping cart. Process 600 then determines, at 630, a set of policies associated with the data object. Referring to FIGS. 1 and 5A as an example, in response to receiving the selection of the UI control, application 115 accesses policies storage 140 and identifies a set of policies associated with the user.

At 640, process 600 applies the set of policies on the data object. Referring to FIGS. 1 and 5A as an example, application 115 applies the set of policies on the data object to be added to the shopping cart. Finally, based on the application of the set of policies on the data object, process 600 determines, at 650, whether to process the data object. Referring to FIGS. 1 and 5A as an example, if any of the policies in the set of policies are violated, application 115 prevents the data object from being added to the shopping cart. If none of the policies in the set of policies are violated, application 115 allows the data object to be added to the shopping cart.

Figure 7:
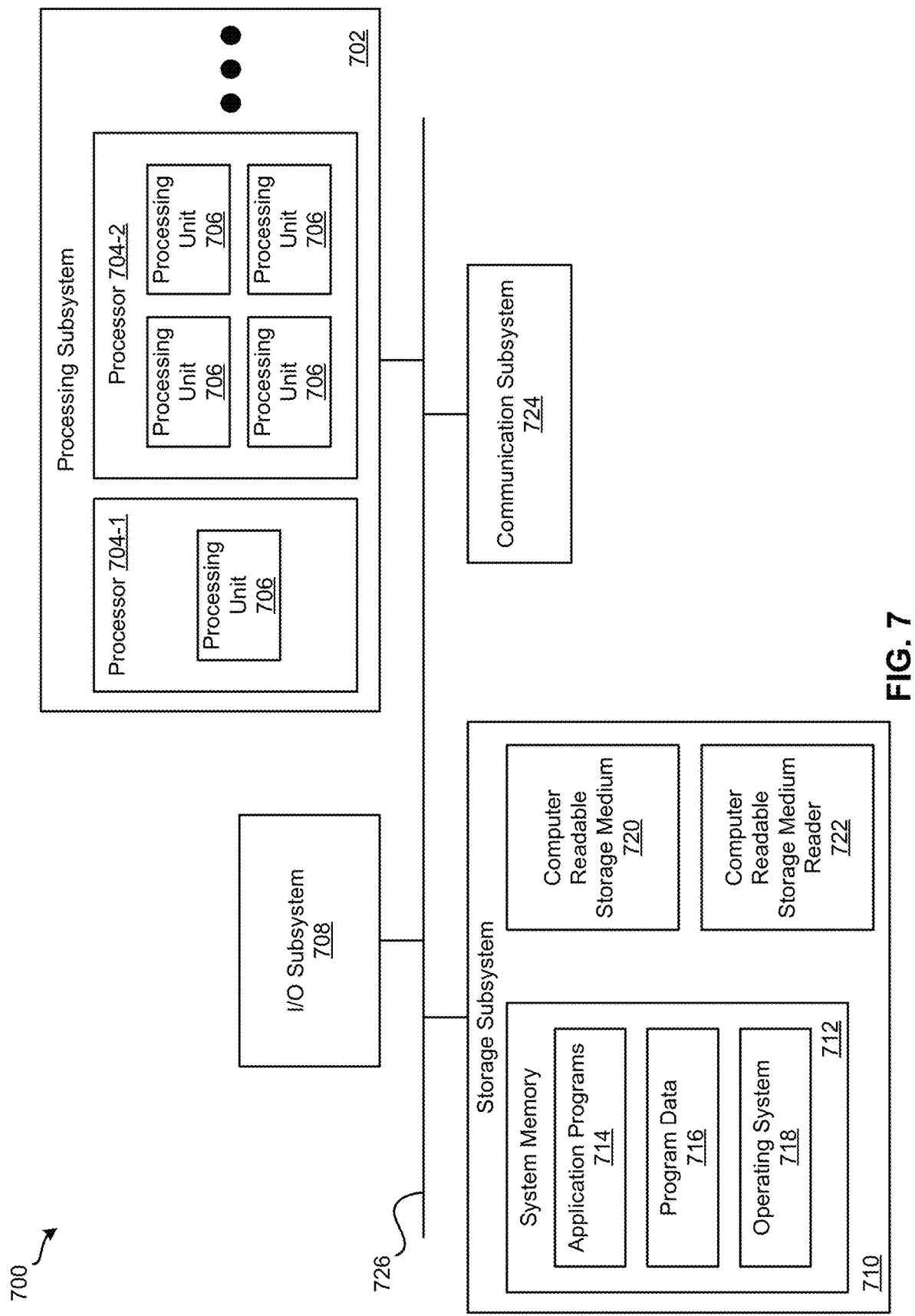
FIG. 7 illustrates an exemplary computer system, in which various embodiments may be implemented.

FIG. 7 illustrates an exemplary computer system 700 for implementing various embodiments described above. For example, computer system 700 may be used to implement client devices 105*a-m*, computing system 110, and external providers 145*a-n*. Computer system 700 may be a desktop computer, a laptop, a server computer, or any other type of computer system or combination thereof. Some or all elements of application 115, search manager 120, collections manager 125, or combinations thereof can be included or implemented in computer system 700. In addition, computer system 700 can implement many of the operations, methods, and/or processes described above (e.g., process 600). As shown in FIG. 7, computer system 700 includes processing subsystem 702, which communicates, via bus subsystem 726, with input/output (I/O) subsystem 708, storage subsystem 710 and communication subsystem 724.

Bus subsystem 726 is configured to facilitate communication among the various components and subsystems of computer system 700. While bus subsystem 726 is illustrated in FIG. 7 as a single bus, one of ordinary skill in the art will understand that bus subsystem 726 may be implemented as multiple buses. Bus subsystem 726 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Extended ISA (EISA) bus, a Video Electronics Standards Association (VESA) local bus, a Peripheral Component Interconnect (PCI) bus, a Universal Serial Bus (USB), etc.

Processing subsystem 702, which can be implemented as one or more integrated circuits (e.g., a conventional microprocessor or microcontroller), controls the operation of computer system 700. Processing subsystem 702 may include one or more processors 704. Each processor 704 may include one processing unit 706 (e.g., a single core processor such as processor 704-1) or several processing units 706 (e.g., a multicore processor such as processor 704-2). In some embodiments, processors 704 of processing subsystem 702 may be implemented as independent processors while, in other embodiments, processors 704 of processing subsystem 702 may be implemented as multiple processors integrate into a single chip or multiple chips. Still, in some embodiments, processors 704 of processing subsystem 702 may be implemented as a combination of independent processors and multiple processors integrated into a single chip or multiple chips.

In some embodiments, processing subsystem 702 can execute a variety of programs or processes in response to program code and can maintain multiple concurrently executing programs or processes. At any given time, some or all of the program code to be executed can reside in processing subsystem 702 and/or in storage subsystem 710. Through suitable programming, processing subsystem 702 can provide various functionalities, such as the functionalities described above by reference to process 600.

I/O subsystem 708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 700 to a user or another device (e.g., a printer).

As illustrated in FIG. 7, storage subsystem 710 includes system memory 712, computer-readable storage medium 720, and computer-readable storage medium reader 722. System memory 712 may be configured to store software in the form of program instructions that are loadable and executable by processing subsystem 702 as well as data generated during the execution of program instructions. In some embodiments, system memory 712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 712 may include different types of memory, such as static random access memory (SRAM) and/or dynamic random access memory (DRAM). System memory 712 may include a basic input/output system (BIOS), in some embodiments, that is configured to store basic routines to facilitate transferring information between elements within computer system 700 (e.g., during start-up). Such a BIOS may be stored in ROM (e.g., a ROM chip), flash memory, or any other type of memory that may be configured to store the BIOS.

As shown in FIG. 7, system memory 712 includes application programs 714 (e.g., application 115), program data 716, and operating system (OS) 718. OS 718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple IOS, Windows Phone, Windows Mobile, Android, BlackBerry OS, Blackberry 10, and Palm OS, WebOS operating systems.

Computer-readable storage medium 720 may be a non-transitory computer-readable medium configured to store software (e.g., programs, code modules, data constructs, instructions, etc.). Many of the components (e.g., application 115, search manager 120, and collections manager 125) and/or processes (e.g., process 600) described above may be implemented as software that when executed by a processor or processing unit (e.g., a processor or processing unit of processing subsystem 702) performs the operations of such components and/or processes. Storage subsystem 710 may also store data used for, or generated during, the execution of the software.

Storage subsystem 710 may also include computer-readable storage medium reader 722 that is configured to communicate with computer-readable storage medium 720. Together and, optionally, in combination with system memory 712, computer-readable storage medium 720 may comprehensively represent remote, local, fixed, and/or removable storage devices plus storage media for temporarily and/or more permanently containing, storing, transmitting, and retrieving computer-readable information.

Computer-readable storage medium 720 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSDs), flash memory card (e.g., secure digital (SD) cards, CompactFlash cards, etc.), USB flash drives, or any other type of computer-readable storage media or device.

Communication subsystem 724 serves as an interface for receiving data from, and transmitting data to, other devices, computer systems, and networks. For example, communication subsystem 724 may allow computer system 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 724 may provide components configured for wired communication (e.g., Ethernet) in addition to or instead of components configured for wireless communication.

One of ordinary skill in the art will realize that the architecture shown in FIG. 7 is only an example architecture of computer system 700, and that computer system 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
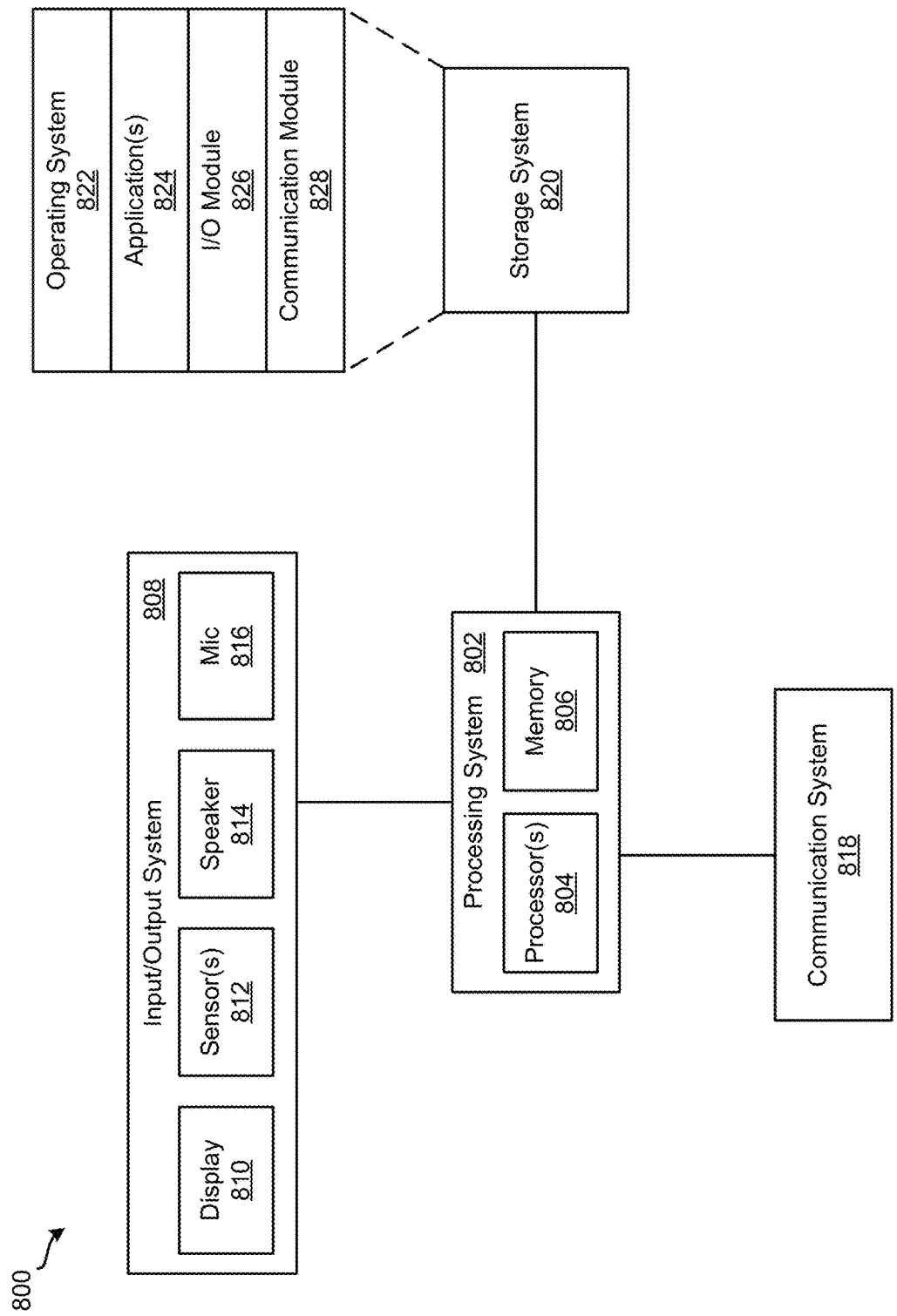
FIG. 8 illustrates an exemplary computing device, in which various embodiments may be implemented.

FIG. 8 illustrates an exemplary computing device 800 for implementing various embodiments described above. For example, computing device 800 may be used to implement client devices 105a-m. Computing device 800 may be a cellphone, a smartphone, a wearable device, an activity tracker or manager, a tablet, a personal digital assistant (PDA), a media player, or any other type of mobile computing device or combination thereof. As shown in FIG. 8, computing device 800 includes processing system 802, input/output (I/O) system 808, communication system 818, and storage system 820. These components may be coupled by one or more communication buses or signal lines.

Processing system 802, which can be implemented as one or more integrated circuits (e.g., a conventional microprocessor or microcontroller), controls the operation of computing device 800. As shown, processing system 802 includes one or more processors 804 and memory 806. Processors 804 are configured to run or execute various software and/or sets of instructions stored in memory 806 to perform various functions for computing device 800 and to process data.

Each processor of processors 804 may include one processing unit (e.g., a single core processor) or several processing units (e.g., a multicore processor). In some embodiments, processors 804 of processing system 802 may be implemented as independent processors while, in other embodiments, processors 804 of processing system 802 may be implemented as multiple processors integrated into a single chip. Still, in some embodiments, processors 804 of processing system 802 may be implemented as a combination of independent processors and multiple processors integrated into a single chip.

Memory 806 may be configured to receive and store software (e.g., operating system 822, applications 824, I/O module 826, communication module 828, etc. from storage system 820) in the form of program instructions that are loadable and executable by processors 804 as well as data generated during the execution of program instructions. In some embodiments, memory 806 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 808 is responsible for receiving input through various components and providing output through various components. As shown for this example, I/O system 808 includes display 810, one or more sensors 812, speaker 814, and microphone 816. Display 810 is configured to output visual information (e.g., a graphical user interface (GUI) generated and/or rendered by processors 804). In some embodiments, display 810 is a touch screen that is configured to also receive touch-based input. Display 810 may be implemented using liquid crystal display (LCD) technology, light-emitting diode (LED) technology, organic LED (OLED) technology, organic electro luminescence (OEL) technology, or any other type of display technologies. Sensors 812 may include any number of different types of sensors for measuring a physical quantity (e.g., temperature, force, pressure, acceleration, orientation, light, radiation, etc.). Speaker 814 is configured to output audio information and microphone 816 is configured to receive audio input. One of ordinary skill in the art will appreciate that I/O system 808 may include any number of additional, fewer, and/or different components. For instance, I/O system 808 may include a keypad or keyboard for receiving input, a port for transmitting data, receiving data and/or power, and/or communicating with another device or component, an image capture component for capturing photos and/or videos, etc.

Communication system 818 serves as an interface for receiving data from, and transmitting data to, other devices, computer systems, and networks. For example, communication system 818 may allow computing device 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 818 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 818 may provide components configured for wired communication (e.g., Ethernet) in addition to or instead of components configured for wireless communication.

Storage system 820 handles the storage and management of data for computing device 800. Storage system 820 may be implemented by one or more non-transitory machine-readable mediums that are configured to store software (e.g., programs, code modules, data constructs, instructions, etc.) and store data used for, or generated during, the execution of the software.

In this example, storage system 820 includes operating system 822, one or more applications 824, I/O module 826, and communication module 828. Operating system 822 includes various procedures, sets of instructions, software components and/or drivers for controlling and managing general system tasks (e.g., memory management, storage device control, power management, etc.) and facilitates communication between various hardware and software components. Operating system 822 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome R: OS, and the like) and/or mobile operating systems such as Apple IOS, Windows Phone, Windows Mobile, Android, BlackBerry OS, Blackberry 10, and Palm OS, WebOS operating systems.

Applications 824 can include any number of different applications installed on computing device 800. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 826 manages information received via input components (e.g., display 810, sensors 812, and microphone 816) and information to be outputted via output components (e.g., display 810) and speaker 814). Communication module 828 facilitates communication with other devices via communication system 818 and includes various software components for handling data received from communication system 818.

One of ordinary skill in the art will realize that the architecture shown in FIG. 8 is only an example architecture of computing device 800, and that computing device 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
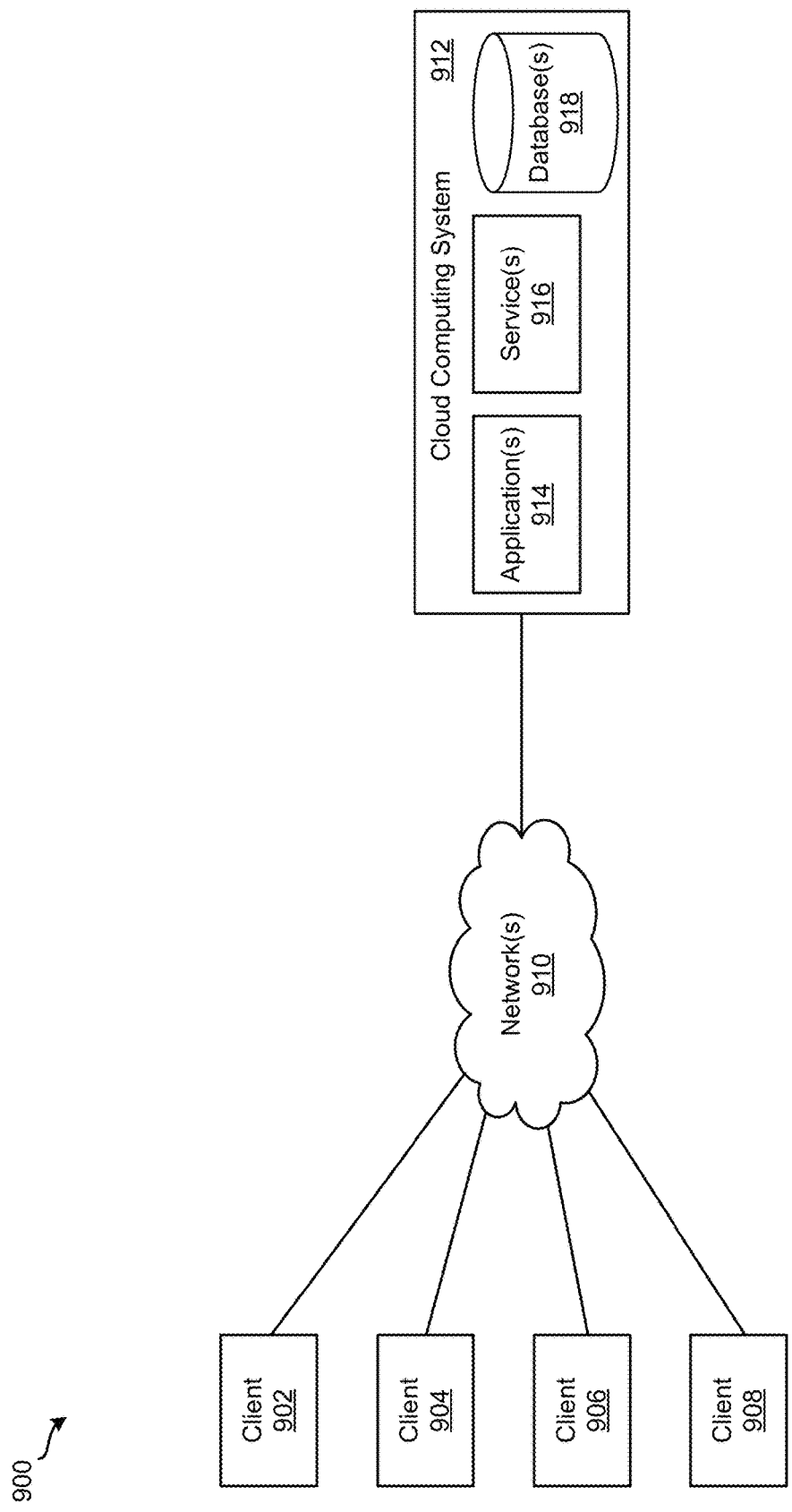
FIG. 9 illustrates an exemplary system, in which various embodiments may be implemented.

FIG. 9 illustrates an exemplary system 900 for implementing various embodiments described above. For example, client devices 902-908 may be used to implement client devices 105a-m and external providers 145a-n. Cloud computing system 912 may be used to implement computing system 110. As shown, system 900 includes client devices 902-908, one or more networks 910, and cloud computing system 912. Cloud computing system 912 is configured to provide resources and data to client devices 902-908 via networks 910. In some embodiments, cloud computing system 912 provides resources to any number of different users (e.g., customers, tenants, organizations, etc.). Cloud computing system 912 may be implemented by one or more computer systems (e.g., servers), virtual machines operating on a computer system, or a combination thereof.

As shown, cloud computing system 912 includes one or more applications 914, one or more services 916, and one or more databases 918. Cloud computing system 912 may provide applications 914, services 916, and databases 918 to any number of different customers in a self-service, subscription-based, elastically scalable, reliable, highly available, and secure manner.

In some embodiments, cloud computing system 912 may be adapted to automatically provision, manage, and track a customer's subscriptions to services offered by cloud computing system 912. Cloud computing system 912 may provide cloud services via different deployment models. For example, cloud services may be provided under a public cloud model in which cloud computing system 912 is owned by an organization selling cloud services and the cloud services are made available to the general public or different industry enterprises. As another example, cloud services may be provided under a private cloud model in which cloud computing system 912 is operated solely for a single organization and may provide cloud services for one or more entities within the organization. The cloud services may also be provided under a community cloud model in which cloud computing system 912 and the cloud services provided by cloud computing system 912 are shared by several organizations in a related community. The cloud services may also be provided under a hybrid cloud model, which is a combination of two or more of the aforementioned different models.

In some instances, any one of applications 914, services 916, and databases 918 made available to client devices 902-908 via networks 910 from cloud computing system 912 is referred to as a "cloud service." Typically, servers and systems that make up cloud computing system 912 are different from the on-premises servers and systems of a customer. For example, cloud computing system 912 may host an application and a user of one of client devices 902-908 may order and use the application via networks 910.

Applications 914 may include software applications that are configured to execute on cloud computing system 912 (e.g., a computer system or a virtual machine operating on a computer system) and be accessed, controlled, managed, etc. via client devices 902-908. In some embodiments, applications 914 may include server applications and/or mid-tier applications (e.g., HTTP (hypertext transfer protocol) server applications, FTP (file transfer protocol) server applications, CGI (common gateway interface) server applications, JAVA server applications, etc.). Services 916 are software components, modules, application, etc. that are configured to execute on cloud computing system 912 and provide functionalities to client devices 902-908 via networks 910. Services 916 may be web-based services or on-demand cloud services.

Databases 918 are configured to store and/or manage data that is accessed by applications 914, services 916, and/or client devices 902-908. For instance, storages 130-140 may be stored in databases 918. Databases 918 may reside on a non-transitory storage medium local to (and/or resident in) cloud computing system 912, in a storage-area network (SAN), on a non-transitory storage medium local located remotely from cloud computing system 912. In some embodiments, databases 918 may include relational databases that are managed by a relational database management system (RDBMS). Databases 918 may be a column-oriented databases, row-oriented databases, or a combination thereof. In some embodiments, some or all of databases 918 are in-memory databases. That is, in some such embodiments, data for databases 918 are stored and managed in memory (e.g., random access memory (RAM)).

Client devices 902-908 are configured to execute and operate a client application (e.g., a web browser, a proprietary client application, etc.) that communicates with applications 914, services 916, and/or databases 918 via networks 910. This way, client devices 902-908 may access the various functionalities provided by applications 914, services 916, and databases 918 while applications 914, services 916, and databases 918 are operating (e.g., hosted) on cloud computing system 912. Client devices 902-908 may be computer system 700 or computing device 800, as described above by reference to FIGS. 7 and 8, respectively. Although system 900 is shown with four client devices, any number of client devices may be supported.

Networks 910 may be any type of network configured to facilitate data communications among client devices 902-908 and cloud computing system 912 using any of a variety of network protocols. Networks 910 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
receiving, from a user in a user interface of a client device, in an application hosted on a first computer system, a specification of a configuration of a collection of data objects hosted on one of a plurality of second computer systems, wherein the configuration specifies the collection of data objects and comprises access information and authentication information for the one of the plurality of second computer systems, and wherein the data objects are items that can be procured;
storing the configuration in a configuration storage;
receiving, from the application, in a search manager hosted on the first computer system, a search query for a queried collection of data objects;
generating, by the search manager, a second query based on the search query;
sending the second query to a collections manager, the collections manager determining if a queried collection of data objects is stored in at least one of a plurality of data object collections storages in the first computer system or one of the plurality of second computer systems,
wherein when the queried collection of data objects is stored in at least one of the data object collections storages on the first computer system or one of the plurality of second computer systems, the collections manager uses the configuration to execute the query on the one of the plurality of data objects collections storage, and
receiving, in the application, search results comprising the queried collection of data objects;
receiving a selection of a data object in the queried collection of data objects;
determining a set of policies associated with the data object;
applying the set of policies on the data object, wherein the set of polices specify whether or not an item can be procured based on one or more criteria; and
based on the application of the set of policies on the data object, determining whether to add the data object to a shopping cart for procurement.

2. The non-transitory machine-readable medium of claim 1, wherein the program further comprises sets of instructions for:
receiving a request to add a collection of data objects to the plurality of collections of data objects; and
adding the collection of data objects to the plurality of collections of data objects.

3. The non-transitory machine-readable medium of claim 1, wherein the program further comprises a set of instructions for receiving, from the client device, a configuration specifying the subset of a plurality of collections of data objects as enabled.

4. The non-transitory machine-readable medium of claim 1, wherein the plurality of collections of data objects includes an internal collection of data objects.

5. The non-transitory machine-readable medium of claim 4, wherein the internal collection of data objects is hosted by the device.

6. The non-transitory machine-readable medium of claim 1, wherein the plurality of collections of data objects includes an external collection of data objects.

7. The non-transitory machine-readable medium of claim 6, wherein the external collection of data objects is hosted by a computing system.

8. A method comprising:
receiving, from a user in a user interface of a client device, in an application hosted on a first computer system, a specification of a configuration of a collection of data objects hosted on a second computer system, wherein the configuration specifies the collection of data objects and comprises access information and authentication information for the second computer system, and wherein the data objects are items that can be procured;

storing the configuration in a configuration storage;

receiving, from the application, in a search manager hosted on the first computer system, a search query for a queried collection of data objects;

generating, by the search manager, a second query based on the search query;

sending the second query to a collections manager, the collections manager determining if a queried collection of data objects is stored in a first data object collections storage on the first computer system or if the queried collection of data objects is stored in a second data object collections storage on the second computer system,
- wherein when the queried collection of data objects is stored in a first data object collections storage on the first computer system, the collections manager executes the query on the first data objects collections storage, and
- wherein when the queried collection of data objects is stored in a second data object collections storage on the second computer system, the collections manager uses the configuration to executes the query on the second data objects collections storage;

receiving, in the application, search results comprising the queried collection of data objects;

receiving a selection of a data object in the queried collection of data objects;

determining a set of policies associated with the data object;

applying the set of policies on the data object, wherein the set of polices specify whether or not an item can be procured based on one or more criteria; and based on the application of the set of policies on the data object, determining whether to add the data object to a shopping cart for procurement.

9. The method of claim 8 further comprising:

receiving a request to add a collection of data objects to the plurality of collections of data objects; and adding the collection of data objects to the plurality of collections of data objects.

10. A system comprising:

a set of processing units; and a non-transitory machine-readable medium storing instructions that when executed by at least one processing unit in the set of processing units cause the at least one processing unit to:

receive, from a user in a user interface of a client device, in an application hosted on a first computer system, a specification of a configuration of a collection of data objects hosted on one of a plurality of second computer systems, wherein the configuration specifies the collection of data objects and comprises access information and authentication information for the one of the plurality of second computer systems, and wherein the data objects are items that can be procured;

store the configuration in a configuration storage;

receive, from the application, in a search manager hosted on the first computer system, a search query for a queried collection of data objects;

generate, by the search manager, a second query based on the search query;

send the second query to a collections manager, the collections manager determining if a queried collection of data objects is stored in at least one of a plurality of data object collections storages in the first computer system or one of the plurality of second computer systems,
- wherein when the queried collection of data objects is stored in at least one of the data object collections storages on the first computer system or one of the plurality of second computer systems, the collections manager uses the configuration to execute the query on the one of the plurality of data objects collections storage, and receive, in the application, search results comprising the queried collection of data objects;

receive a selection of a data object in the collection of data objects;

determine a set of policies associated with the data object;

apply the set of policies on the data object, wherein the set of polices specify whether or not an item can be procured based on one or more criteria; and based on the application of the set of policies on the data object, determine whether to add the data object to a shopping cart for procurement.

11. The system of claim 10, wherein the instructions further cause the at least one processing unit to:

receive a request to add a collection of data objects to the plurality of collections of data objects; and add the collection of data objects to the plurality of collections of data objects.

12. The system of claim 10, wherein the instructions further cause the at least one processing unit to receive, from the client device, a configuration specifying the subset of a plurality of collections of data objects as enabled.

13. The system of claim 10, wherein the plurality of collections of data objects includes an internal collection of data objects.

14. The system of claim 13, wherein the internal collection of data objects is hosted by the system.

15. The system of claim 10, wherein the plurality of collections of data objects includes an external collection of data objects.

* * * * *